(12) United States Patent
Hsu (10) Patent No.: US 10,751,931 B1
(45) Date of Patent: Aug. 25, 2020

(54) PACKAGING BOX OF COVERING FILM AND FILM APPLICATOR

(71) Applicant: Hsiang-Pin Hsu, Taipei (TW)

(72) Inventor: Hsiang-Pin Hsu, Taipei (TW)

(*) Notice: Subject to any disclaimer, the term of this patent is extended or adjusted under 35 U.S.C. 154(b) by 0 days.

(21) Appl. No.: 16/287,682

(22) Filed: Feb. 27, 2019

(51) Int. Cl.
| | |
|---|---|
| *B29C 63/02* | (2006.01) |
| *B65D 81/02* | (2006.01) |
| *B65D 85/68* | (2006.01) |
| *B29C 63/00* | (2006.01) |
| *B29L 31/34* | (2006.01) |
| *B65D 43/02* | (2006.01) |

(52) U.S. Cl.
CPC .......... *B29C 63/0004* (2013.01); *B29C 63/02* (2013.01); *B65D 81/02* (2013.01); *B65D 85/68* (2013.01); *B29C 2063/0008* (2013.01); *B29L 2031/3437* (2013.01); *B29L 2031/3475* (2013.01); *B65D 43/022* (2013.01); *B65D 2543/00018* (2013.01); *B65D 2585/6835* (2013.01)

(58) Field of Classification Search
None
See application file for complete search history.

(56) References Cited

U.S. PATENT DOCUMENTS

| | | | | |
|---|---|---|---|---|
| 8,369,072 B1* | 2/2013 | Alonzo | ............... | H04M 1/0266 361/679.01 |
| 8,517,367 B1* | 8/2013 | Napier | ................ | B32B 37/0046 269/289 R |
| 9,688,016 B2* | 6/2017 | Rostami | .............. | B29C 63/0004 |
| 9,701,062 B2* | 7/2017 | Wadsworth | ........... | B29C 66/861 |
| 2012/0211171 A1* | 8/2012 | Patel | ....................... | B29C 63/02 156/538 |
| 2013/0020020 A1* | 1/2013 | Liu | ....................... | G06F 1/1656 156/247 |
| 2014/0047708 A1* | 2/2014 | Chae | ................... | B29C 63/0004 29/700 |
| 2014/0130971 A1* | 5/2014 | Wu | ........................ | H05K 13/00 156/249 |
| 2014/0230988 A1* | 8/2014 | Chou | .................... | H05K 13/00 156/60 |
| 2016/0176101 A1* | 6/2016 | Fan | ..................... | B29C 63/0004 156/539 |
| 2016/0288406 A1* | 10/2016 | Kang | .................. | B29C 63/0004 |
| 2016/0294428 A1* | 10/2016 | Li | ....................... | B29C 63/0004 |

* cited by examiner

*Primary Examiner* — Jethro M. Pence
(74) *Attorney, Agent, or Firm* — Rabin & Berdo, P.C.

(57) ABSTRACT

The present invention discloses a packaging box of a covering film and a film applicator. By structural designs of the packaging box and the covering film, the packaging box is provided with an internal cavity matching an outer shape of an electronic device and the covering film includes a release film having an extension portion, enabling the packaging box to provide the covering film with storage, dustproof and shock-absorbing functions and to further serve as a film application auxiliary tool when a film application process is performed. Thus, a user is allowed to accurately, quickly and efficiently form a layer providing protection on a surface of the electronic device directly by using the packaging box.

8 Claims, 7 Drawing Sheets

PACKAGING BOX OF COVERING FILM AND FILM APPLICATOR

BACKGROUND OF THE INVENTION

Field of the Invention

The present invention relates to a packaging box, and more particularly to a packaging box of a covering film and a film applicator forming a layer providing protection on a surface of an electronic device by directly using the packaging box.

Description of the Prior Art

To provide protection for a surface of an electronic device, a layer is usually adhered to the surface of the electronic device to serve as a protective film. For mobile communication devices commonly used by individuals, a touch screen of such mobile device is usually adhered with a protective film, or some individuals even have a habit of applying a film to a rear side of a casing, so as to provide the surface of the mobile communication device with more comprehensive protection.

Precise alignment and an appropriate force frequently need to be applied during film application in order to have a film be accurately and securely adhered to a surface of an electronic device. However, in conventional film application, determination and adjustment are performed manually, and a film often needs to be re-applied as a result of imprecise alignment or bubbles formed, causing low efficiency and even a waste in film materials. Further, in regard to a film application result of deviated alignment, although a user may not care much about the slight deviation, dust can easily accumulate and appear unattractive since edges of the protective film are not thoroughly adhered to the surface of an electronic device.

SUMMARY OF THE INVENTION

It is an object of the present invention to provide a more convenient and simple film application process.

It is another object of the present invention to enhance film application efficiency and improve alignment precision.

It is another object of the present invention to properly store a covering film to prevent accumulated dust.

It is yet another object of the present invention to provide a surface of an electronic device with a dust removal effect as well as taking away possible dust on a release layer while a film application process is performed.

To achieve the above and other objects, the present invention discloses a film applicator for forming a layer providing protection on a surface of an electronic device. The film applicator includes a covering film and a packaging box. The covering film includes a main layer and a first release layer. The main layer has a top surface and a bottom surface. The first release layer is removably attached to the top surface of the main layer, and includes a folding portion formed on one end of the main layer. The first release layer is folded in reverse at the folding portion and extends towards the other side opposite to the end of the main layer to form an extension portion, and the first release layer includes a pull portion at an end of the extension portion. The packaging box includes an upper cover and a lower cover having a recess. The upper cover is operable to mutually cover with the lower cover to define an internal cavity. The covering film is stored in the recess, and a wall on one side of the recess has an indented slot for storing the pull portion. A lower side surface of the upper cover includes a pressing portion projecting towards the internal cavity.

In an embodiment, the covering film is configured at a bottom of the recess, and the recess is for placing the electronic device when a film application process is performed to enable the first release layer of the covering film to come into contact with the electronic device.

In an embodiment, by mutually covering the upper cover and the lower cover and with pressing of the pressing portion, the electronic device is closely pressed against the covering film when the film application process is performed, and the first release layer is removed from the main layer from the folding portion after the pull portion of the covering film is pulled.

In an embodiment, an adhesive is present on a surface of the main layer in contact with the first release layer, and when the first release layer is removed, the adhesive on the main layer is in contact with the electronic device such that the main layer is adhered on the electronic device.

In an embodiment, the bottom surface of the main layer is attached with a removable second release layer, and hardness and thickness of the first release layer and the second release layer are less than those of the main layer.

In an embodiment, the first release layer and the second release layer are separately attracted by static electricity to the top surface and the bottom surface of the main layer, and the extension portion of the first release layer and the pull portion are not attracted to the main layer.

In an embodiment, further comprising a filler, the filler configured in the recess when the film application process is not performed; when the upper cover is covered with the lower cover, the filler pushing against the covering film and the upper cover such that the covering film is securely held and stored in the packaging box.

In an embodiment, the covering film is used on a display screen of an electronic device to form the main layer serving as a protective layer, and shapes of an opening and walls of the recess match an outer shape of the electronic device.

To achieve the above and other objects, the present invention further discloses a packaging box of a covering film. The packaging box, for storing a covering film, includes: a first cover, a second cover, a recess configured at least at the first cover or the second cover, and a pressing portion configured at least at the first cover or the second cover. The first cover has a first upper side surface and a first lower side surface opposite to the first upper side surface. The second cover has a second upper side surface and a second lower side surface opposite to the second upper side surface. The second cover and the first cover are mutually covered and define an internal cavity for storing the covering film. An opening of the recess faces the internal cavity, and the pressing portion projects towards the internal cavity.

In an embodiment, the covering film is used on a surface of an electronic device to form a layer providing protection, and shapes of the opening and walls of the recess match an outer shape of the electronic device.

In an embodiment, the pressing portion is elastic and has an outer surface applying a pressure of different levels on the electronic device.

In an embodiment, the pressing portion is elastic and is a rib.

In an embodiment, the pressing portion is for directly applying a pressure on the covering film, and the pressing portion is an elastic plate having a thickness gradually increasing from an edge towards a center direction.

In an embodiment, the pressing portion directly applies a pressure on the filler, and the pressing portion has a progressive change in an outer shape in a first direction such that the thickness of the plate gradually increases in the first direction.

In an embodiment, the pressing portion does not have the progressive change in the outer shape in a second direction perpendicular to the first direction.

In an embodiment, a wall on one side of the recess is a dented slot, and the slot is for storing a pull portion on one end of the covering film.

In an embodiment, the mutually covered first cover and second cover separate the internal cavity from an exterior of the packaging box.

Thus, the packaging box of a covering film and a film applicator including a covering film and a packaging box disclosed by the present invention enable a main layer serving as a protective film to be easily operated to precisely perform, on the basis of the packaging box acting as a film application auxiliary tool, a film application process on a surface of an electronic device, and a user is no longer required to purchase other tools assisting in film application, thereby reducing costs.

The packaging box disclosed by the present invention can further store the covering film in a sealed internal cavity to prevent contamination of dust. The pressing portion in the packaging box can apply an even and progressive pressure on the covering film, reducing the probability of the covering film coming into contact with air. In addition to preventing the accumulation of dust, during the film application process, an issue of a slow air discharge speed caused by a non-uniform force applied can be avoided by the even and processive pressure applied, further significantly reducing the generation of bubbles. With the release layer attracted by static electricity and adhered to the main layer, a dust removal function is provided by the attraction of static electricity. Therefore, the packaging box, serving for packaging and storage purposes and at the same time as a film application auxiliary tool, provides a film application solution allowing user with a simple operation and being resistant against dust accumulation and bubbles as well as having precise alignment.

DETAILED DESCRIPTION OF THE EMBODIMENTS

Objectives, features, and advantages of the present disclosure are hereunder illustrated with specific embodiments, depicted with drawings, and described below.

Words, such as "a", "an" and "one", used herein are descriptive of the components, structures, portions, devices, and areas to not only facilitate illustration but also define generally the scope of the present disclosure. Therefore, unless otherwise specified expressly, the words must be interpreted to mean "one" or "at least one" and thereby describe a singular noun or a plural noun.

Words, such as "comprise", "include", "have" and any equivalent thereof, used herein are not restricted to elements disclosed herein. Instead, the words may be descriptive of any elements which are not expressly disclosed herein but are required for the components, structures, portions, devices, and areas.

Ordinal numbers, such as "first" and "second", used herein are intended to distinguish or correlate identical or similar components or structures and do not necessarily imply what order the components, structures, portions, or areas are in terms of space or time. It is understood that in some situations or arrangements the ordinal numbers may be swapped without affecting the effects of implementation of the present disclosure.

Figure 1:
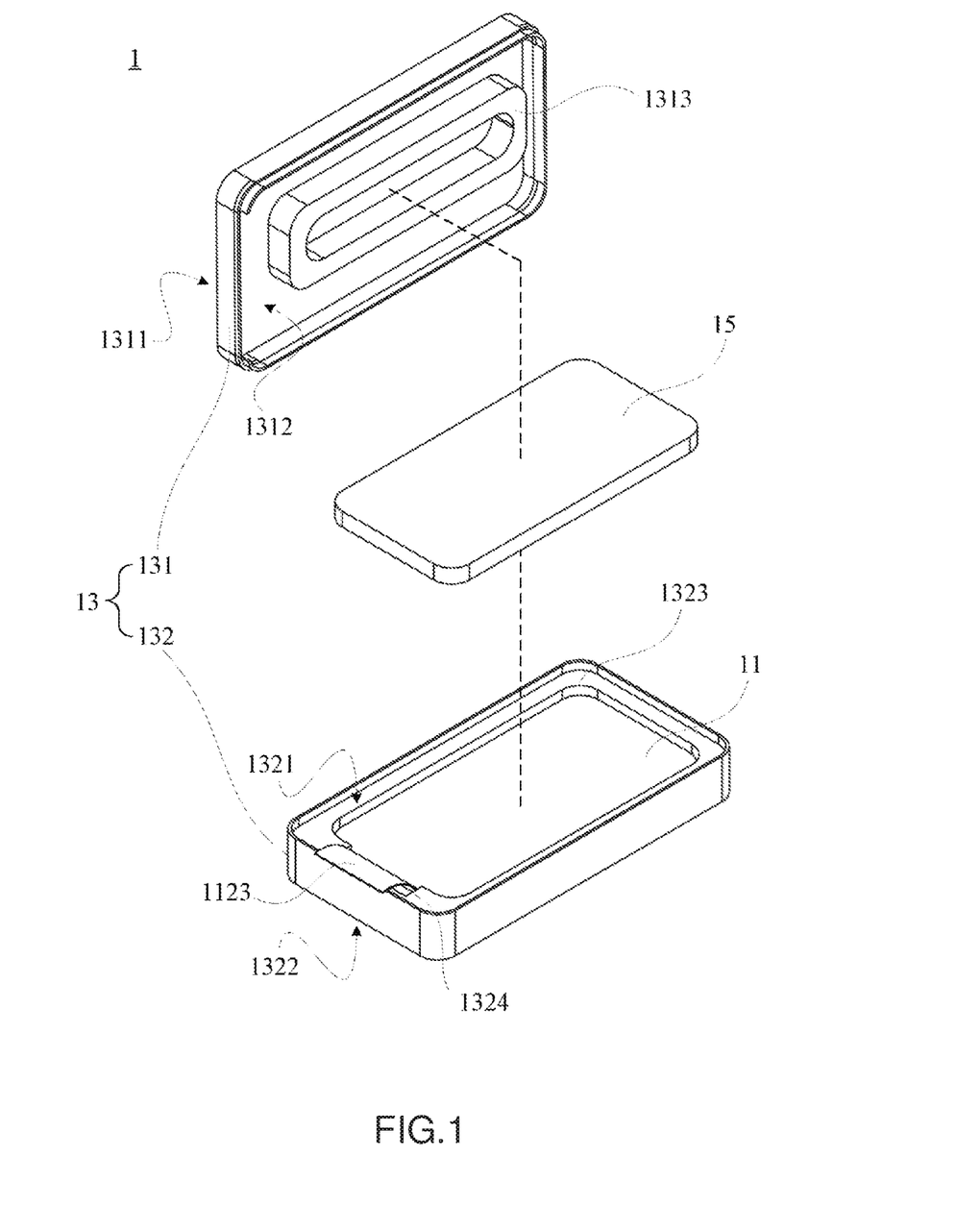
FIG. 1 is a first exploded schematic diagram of a film applicator according to an embodiment of the present invention.
Figure 2:
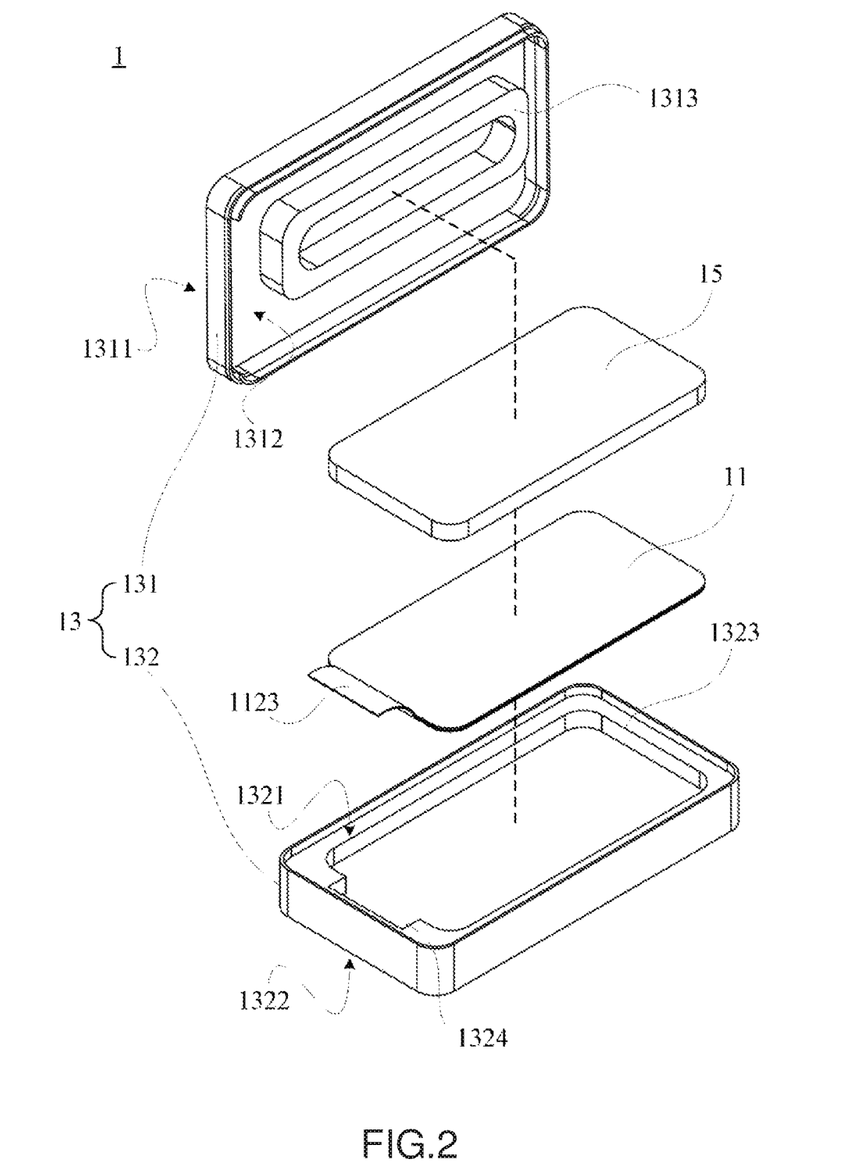
FIG. 2 is a second exploded schematic diagram of FIG. 1.
Figure 3:
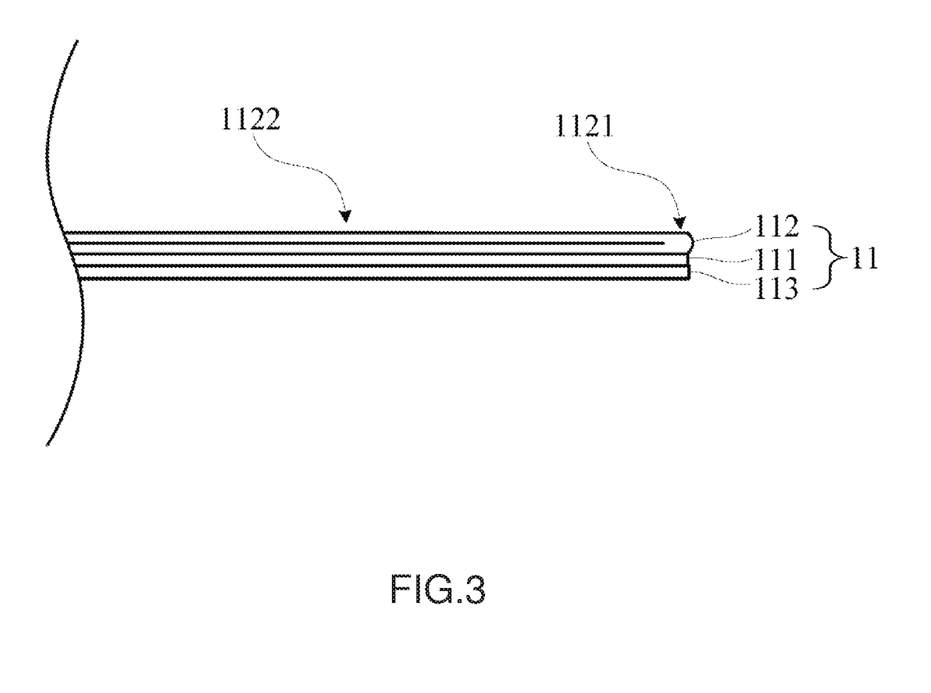
FIG. 3 is a partial schematic diagram of a covering film according to the embodiment in FIG. 1.

Referring to FIG. 1 to FIG. 3, FIG. 1 is a first exploded schematic diagram of a film applicator according to an embodiment of the present invention, FIG. 2 is a second exploded diagram of FIG. 1, and FIG. 3 is a partial schematic diagram of a covering film according to the embodiment in FIG. 1. The film applicator 1 includes a covering film 11 and a packaging box 13. In this embodiment, a filler 15 is further included. The packaging box 13 includes an upper cover 131 and a lower cover 132. The covering film 11 can be stored in the packaging box 13, and be separated from the exterior by the packaging box 13 to achieve a sealed effect. In general, the packaging box 13 is an outer package of a product, i.e., an outer package of the product of the covering film 11. In other implementations, other packaging objects can also be added outside the packaging box 13, for example, a packaging jacket.

The upper cover 131 has a first upper side surface 1311, and a first lower side surface 1312 opposite to the first upper side surface 1311. The lower cover 132 has a second upper side surface 1321, and a second lower side surface 1322 opposite to the second upper side surface 1321. The second upper side surface 1321 of the lower cover 132 is configured with a recess 1323. By covering the upper cover 131 with the lower cover 132, an internal cavity can be defined at an interior. The internal cavity can be used for storing the covering film 11. Meanwhile, with the configuration of a filler 15, the covering film 11 can be securely held at the bottom of the recess 1323.

In the examples in FIG. 1 and FIG. 2, the filler 15 is exemplified by a block-like plate. The dimensions of the plate can be configured to be close to the dimensions of an outer shape of an electronic device to be placed during a film application process, and can be an elastic body such as plastic sponge or expandable polystyrene (EPS), so as to fill the internal cavity as much as possible to further better secure the covering film 11. In other embodiments, the filler 15 can have other dimensions or shapes instead of being limited to the examples shown in FIG. 1 and FIG. 2 or the foregoing materials, given that an effect of securely holding the covering film 11 in the internal cavity is achieved.

As shown in FIG. 2 and FIG. 3, the covering film 11 includes a main layer 111 and a first release layer 112. The main layer 11 has a top surface and a bottom surface. The first release layer 112 is removably attached on the main layer 111. As shown in FIG. 3, the first release layer 112 is attached to the top surface of the main layer 111. Further, the first release layer 112 includes a folding portion 1121 formed by a reversely folding the first release layer 112 on one end of the main layer 111. By folding in reverse at the folding portion 1121, the first release layer 112 extends towards the other end and forms an extension portion 1122. The extension portion 1122 extends towards the other end of the main layer 111 opposite to the position of the folding portion 1121, and the first release layer 112 further includes a pull portion 1123 at the end of the extension portion 1122.

As shown in FIG. 3, to achieve further protection on the main layer 11, the bottom surface of the main layer 11 can also be attached with a second release layer 113. The first release layer 112 and the second release layer 113 can be attached on the surface of the main layer 11 through an attraction effect of static electricity. For example, the first release layer 112 and the second release layer 113 can be flexible thin films or plastic films having a small thickness, and the main layer 11 is preferably a thicker or harder film layer or plastic film. In other embodiments, the main layer 11 can also be a thicker flexible film.

Shapes of an opening and walls of the recess 1323 can match with an outer shape of an electronic device to be placed during a film application process. During a film application process, the covering film 11 can be pressed under the electronic device, that is, the first release layer 112 of the covering film 11 needs to face upwards, such that the main layer 111 can come into contact with the surface of the electronic device to be applied with a protective film once the first release layer 112 is removed, and is adhered to the surface of the electronic device by an adhesive applied to the top surface of the main layer 111. For example, the adhesive can be an optically clear adhesive (OCA) or other adhesive materials.

A slot 1324 having a dented wall and used for storing the pull portion 1123 of the first release layer 112 is provided at an end of the recess 1323 of the packaging box 13 and at a position corresponding to an end of the first release layer 112. Further, the lower side surface of the upper cover 131 includes a pressing portion 1313 projecting towards the inner cavity. The pressing portion 1313 can be an elastic outer surface applying a pressure of different levels on an object placed in the internal cavity. As shown in FIG. 1, the pressing portion 1313 is an elastic rib.

Figure 4:
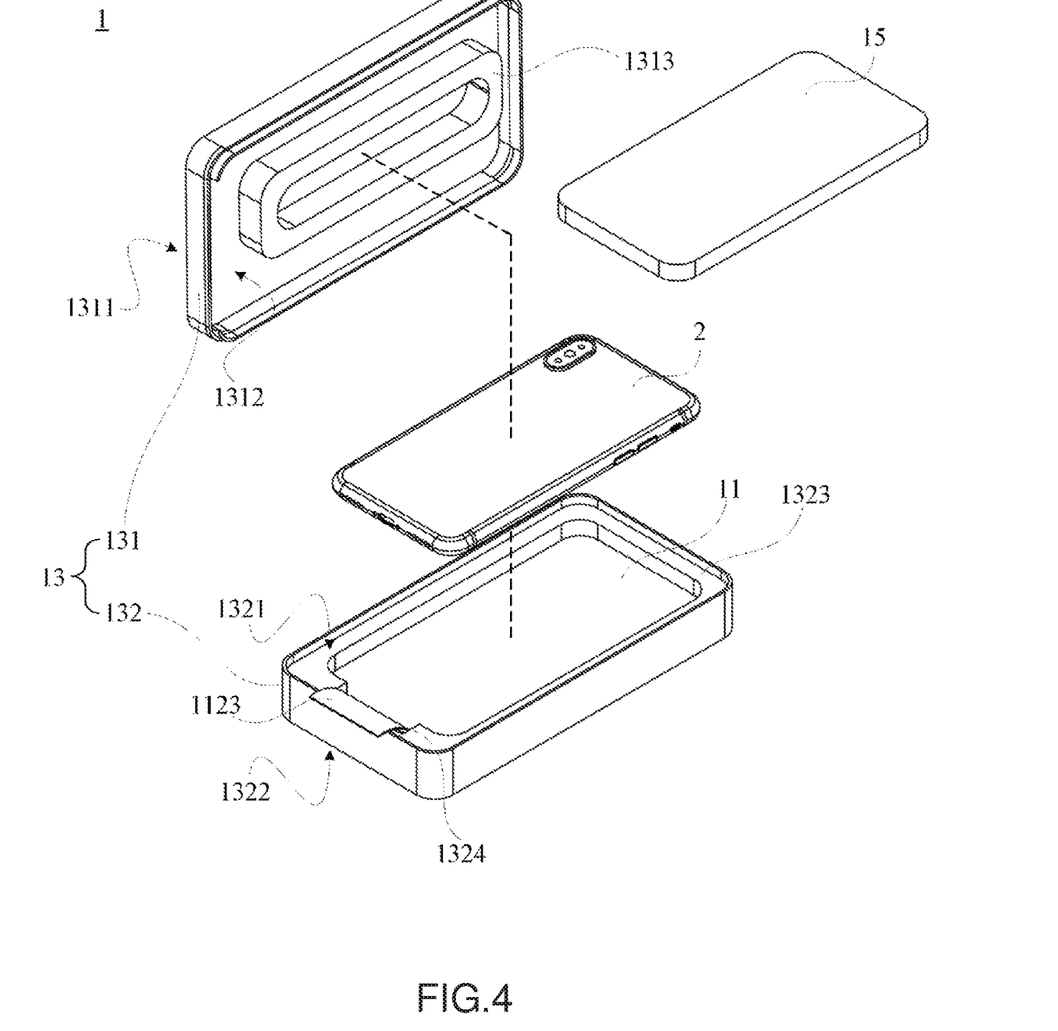
FIG. 4 is a first schematic diagram of a state of use of a film applicator according to an embodiment of the present invention.
Figure 5:
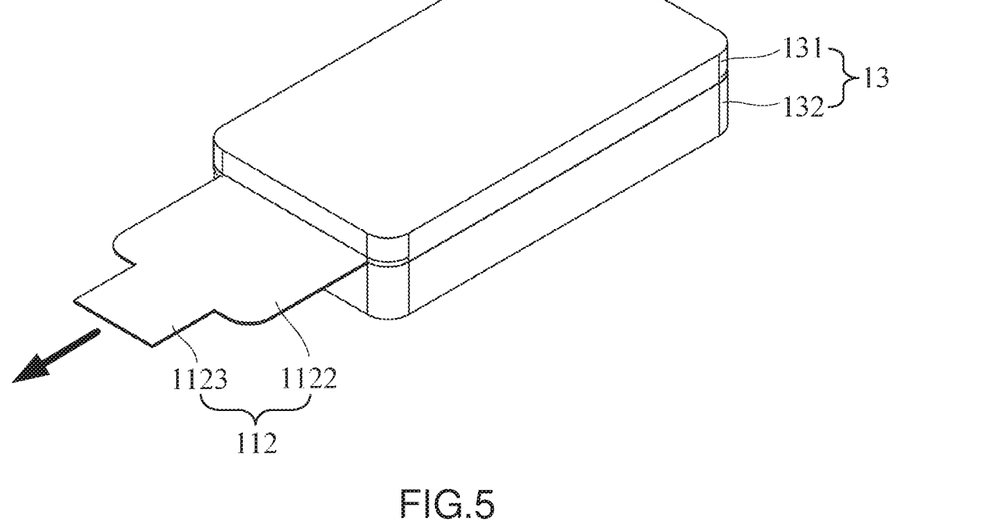
FIG. 5 is a second schematic diagram of a state of use of a film applicator according to an embodiment of the present invention.
Figure 6:
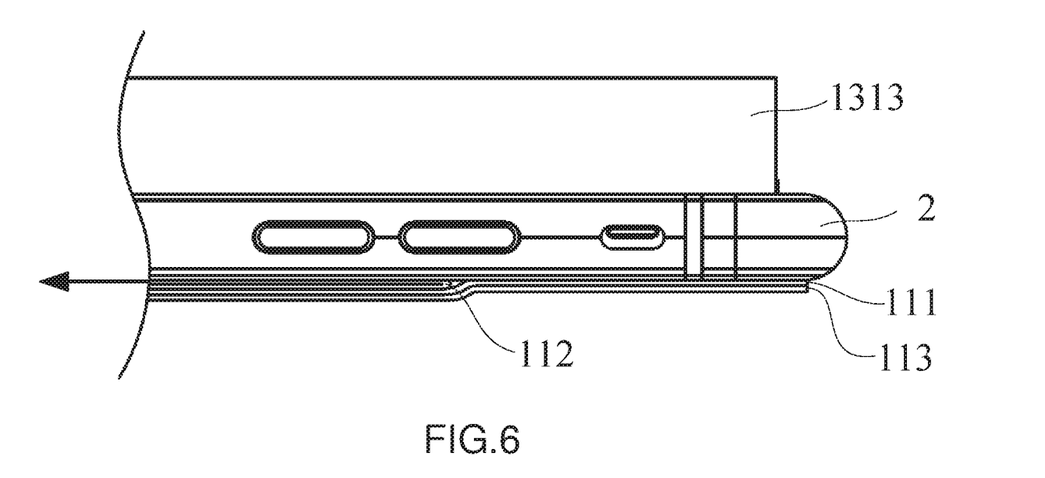
FIG. 6 is a partial schematic diagram of a covering film according to the embodiment in FIG. 5.

Referring to FIG. 4 to FIG. 6, FIG. 4 is a first diagram of a state of use of a film applicator according to an embodiment of the present invention, FIG. 5 is a second diagram of a state of use of a film applicator according to an embodiment of the present invention, and FIG. 6 is a partial schematic diagram of a covering film according to the embodiment in FIG. 5.

A user can first open the upper cover 131 of the packaging box 13, take out the filler 15 placed therein, leave the covering film 11 (not shown, with only the pull portion 1123 depicted) at the recess bottom of the recess 1323, place an electronic device 2 in the recess 1323, and have a surface to be applied with a protective layer be in contact with the covering film 11 left at the recess bottom.

The user can then mutually cover the upper cover 131 and the lower cover 132 to expose the pull portion 1123 outside the packaging box 13. After covering the packaging box 13, the pressing portion 1313 can be caused to apply a pressure upon the electronic device 2, so as to have the bottom surface of the electronic device 2 come close to the covering film 11. Next, the user can pull the pull portion 1123 to pull the first release layer 112 off from the top surface of the main layer 111 from the position of the folding portion, so as to allow the adhesive at the top surface of the main layer 111 come into contact with the bottom surface of the electronic device 2, i.e., the surface to be applied with the protective film. Thus, the main layer 111 can be adhered on the bottom surface of the electronic device 2. Further, based on the property of being soft and thin of the first release layer 112, and that the first release layer 112 is attached on the main layer 111 by merely the attraction of static electricity, the first release layer 112 can be easily removed from the top surface of the main layer 111 even under a moderate pulling force. Moreover, during the removal, dust or other impurities on the bottom surface of the electronic device 2 can also be taken away on the basis of the attraction of static electricity from the bottom surface of the electronic device 2.

Last, after the user completely pulls and removes the first release layer 112, opens the upper cover 131 and takes out the electronic device 2, the film application performed on the electronic device 2 is completed. The above film applicator is more suitable for adhering a protective layer on, for example, a touch screen of a smartphone or personal digital assistant. After the user obtains the packaging box serving as a film applicator of a film application auxiliary tool, a film application process being highly precise and highly convenient can be completed independently by the user.

The implementation of the covering film 11 placed under the electronic device 2 in the foregoing embodiments is a preferred aspect. With the weight of the electronic device 2 itself and the pressing portion 1313, the covering film 11 placed at a flat recess bottom can be located closely to the electronic device 2; however, the present invention is not limited to the above example. Alternatively, the electronic device 2 can be configured to be in contact with the recess bottom, the covering film 11 covers the electronic device 2, and the pressing portion 1313 is in direct contact with the covering film 11. In this implementation, the pressing portion 1313 directly applies a pressure on the covering film 11, and is an elastic plate having a thickness configured to gradually increase from an edge towards a center direction.

In other embodiments, the cover of the packaging box 13 can be divided into a first cover and a second cover, e.g., the foregoing upper cover 131 and lower cover 132, and the foregoing recess 1323 can be configured at both or only one of the first cover and the second cover. In the implementation where the recess 1323 is configured at both the first cover and the second cover, the internal cavity can be evenly provided by both of the first cover and the second cover, that is, each of the first cover and the second cover has a portion recessed by a certain level to form the recess 1323.

Further, the pressing portion 1313 can be provided on both or only one of the first cover and the second cover. In the implementation where the pressing portion 1313 is configured on both the first cover and the second cover, it means that a pressing structure for pressing is also provided in the recess 1323, such that the means for pressing can correspond to a pressing portion with a matching design on the basis of electronic devices having different outer shapes.

In another embodiment, the recess 1323 and the pressing portion 1313 can be simultaneously configured together, or configured at only the first cover or the second cover.

Figure 7:
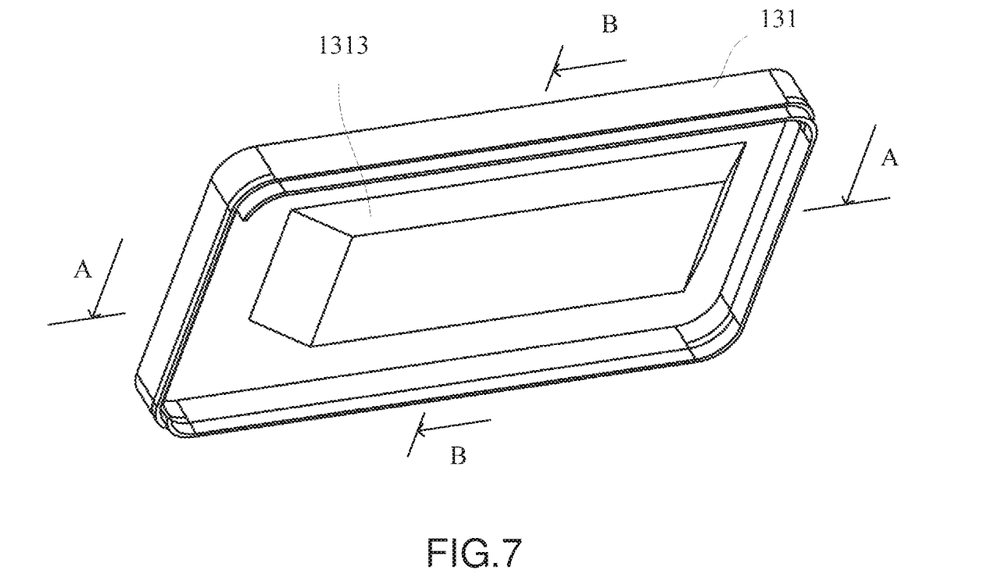
FIG. 7 is a schematic diagram of an upper cover of a packaging box according to an embodiment of the present invention.
Figure 8:
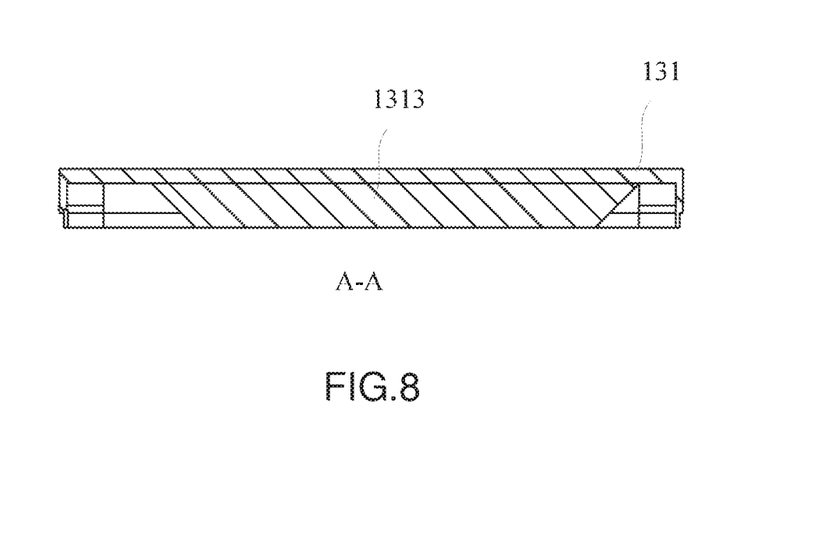
FIG. 8 is a section diagram of an upper cover below a section line AA in FIG. 7.
Figure 9:
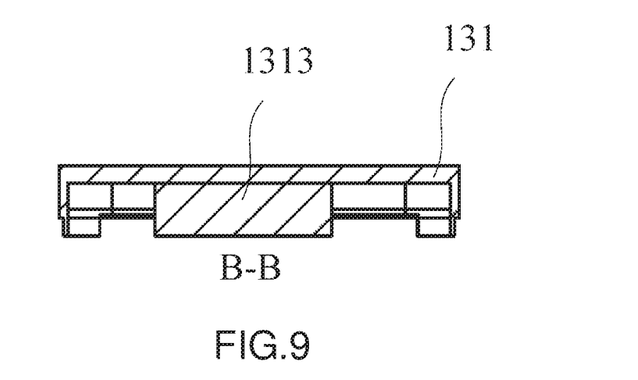
FIG. 9 is a section diagram of an upper cover below a section line BB in FIG. 7.

Referring to FIG. 7 to FIG. 9, FIG. 7 is a schematic diagram of an upper cover of a packaging box according to an embodiment of the present invention, and FIG. 8 shows a section diagram of an upper cover below a section line AA in FIG. 7, and FIG. 9 shows a section diagram of an upper cover below the section line BB in FIG. 7. In the example in FIG. 8, the pressing portion 1313 has a progressive change in the outer shape in a first direction, such that the thickness of the plate gradually increases in the first direction and then gradually decreases towards the end; however, the end may be preserved with the thickness of a central part instead of being gradually decreased. As shown in FIG. 6 and FIG. 9, the progressive part at a front end corresponds to the folding portion 1121 of the covering film 11, allowing the first release layer 112 to be more easily pulled off from the main layer 111.

As shown in FIG. 9, the pressing portion 1313, instead of having a progressive change in the outer shape in a second direction perpendicular to the first direction, may have the same thickness such that a same and uniform pressure is applied on the electronic device 2 and the covering film 11.

Figure 10:
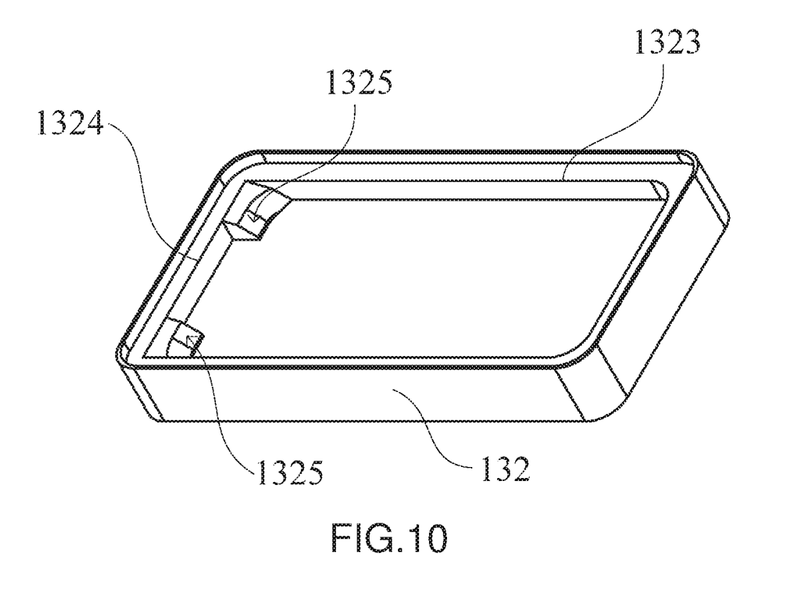
FIG. 10 is an exploded schematic diagram of a film applicator according to another embodiment of the present invention.

Referring to FIG. 10, FIG. 10 is an exploded schematic diagram of a film applicator according to another embodiment of the present invention. The two-side joint portion 1325 between the recess 1323 and the slot 1324 can be a progressive rising structure, so that the first release layer 112 can be more easily pulled out from the packaging box 13.

In conclusion, according to the embodiments of the present invention disclosed above, in addition to providing the covering film with storage, dustproof and shock-absorbing functions, the packaging box can further directly serve as a film application auxiliary tool when a film application process is performed. Thus, a user is allowed to accurately, quickly and efficiently form a layer providing protection on a surface of the electronic device directly by using the packaging box.

The present disclosure is illustrated by various aspects and embodiments. However, persons skilled in the art understand that the various aspects and embodiments are illustrative rather than restrictive of the scope of the present disclosure. After perusing this specification, persons skilled in the art may come up with other aspects and embodiments without departing from the scope of the present disclosure. All equivalent variations and replacements of the aspects and the embodiments must fall within the scope of the present disclosure. Therefore, the scope of the protection of rights of the present disclosure shall be defined by the appended claims.

What is claimed is:

1. A film applicator, for forming a layer providing protection on a surface of an electronic device, the film applicator comprising:
   a covering film, comprising a main layer and a first release layer, the main layer having a top surface and a bottom surface, the first release layer removably attached to the top surface of the main layer, the first release layer comprising a folding portion formed on one end of the main layer, the first release layer folded in reverse at the folding portion and extending towards one other end opposite to the end of the main layer to form an extension portion, the first release layer comprising a pull portion at an end of the extension portion; and
   a packaging box, comprising an upper cover and a lower cover having a recess, the upper cover operable to mutually cover with the lower cover to define an internal cavity, the covering film stored in the recess, a wall on one side of the recess having an indented slot for storing the pull portion, a lower side surface of the upper cover comprising a pressing portion projecting towards the internal cavity.

2. The film applicator according to claim 1, wherein the covering film is configured at a bottom of the recess, and the recess is for placing the electronic device when a film application process is performed to enable the first release layer of the covering film to come into contact with the electronic device.

3. The film applicator according to claim 2, wherein, by mutually covering the upper cover and the lower cover and with pressing of the pressing portion, the electronic device is closely pressed against the covering film when the film application process is performed, and the first release layer is removed from the main layer from the folding portion after the pull portion of the covering film is pulled.

4. The film applicator according to claim 3, wherein an adhesive is present on a surface of the main layer in contact with the first release layer, and when the first release layer is removed, the adhesive on the main layer is in contact with the electronic device such that the main layer is adhered on the electronic device.

5. The film applicator according to claim 3, wherein the bottom surface of the main layer is attached with a removable second release layer, and hardness and thickness of the first release layer and the second release layer are less than those of the main layer.

6. The film applicator according to claim 5, wherein the first release layer and the second release layer are separately attracted by static electricity to the top surface and the bottom surface of the main layer, and the extension portion of the first release layer and the pull portion are not attracted to the main layer.

7. The film applicator according to claim 1, further comprising:
   a filler, configured in the recess when the film application process is not performed; when the upper cover is covered with the lower cover, the filler pushing against the covering film and the upper cover such that the covering film is securely held and stored in the packaging box.

8. The film applicator according to claim 1, wherein the covering film is used on a display screen of an electronic device to form the main layer serving as a protective layer, and shapes of an opening and walls of the recess match an outer shape of the electronic device.

* * * * *